(12) United States Patent
Wang

(10) Patent No.: US 7,040,036 B1
(45) Date of Patent: May 9, 2006

(54) DISTANCE MEASURING DEVICE

(76) Inventor: Hui Chen Wang, 10F-2, No. 186, Daduen 19th Street, Taichung 407 (TW)

( * ) Notice: Subject to any disclaimer, the term of this patent is extended or adjusted under 35 U.S.C. 154(b) by 6 days.

(21) Appl. No.: 11/042,040

(22) Filed: Jan. 25, 2005

(51) Int. Cl.
*G01B 3/12* (2006.01)

(52) U.S. Cl. .......................................... 33/782; 33/772
(58) Field of Classification Search ........... 33/772–782
See application file for complete search history.

(56) References Cited

U.S. PATENT DOCUMENTS

| | | | | |
|---|---|---|---|---|
| 2,817,906 | A * | 12/1957 | Hall ............................. | 33/772 |
| 3,629,557 | A * | 12/1971 | Lareau .......................... | 33/772 |
| 3,816,926 | A * | 6/1974 | Gfeller ........................ | 33/772 |
| 4,053,985 | A * | 10/1977 | Spentzas ...................... | 33/1 N |
| 4,377,850 | A * | 3/1983 | Simpson ...................... | 33/773 |
| 4,532,710 | A * | 8/1985 | Kinney et al. ................ | 33/772 |
| 5,477,622 | A * | 12/1995 | Skalnik ........................ | 33/781 |
| 5,749,522 | A * | 5/1998 | Smrt ............................. | 33/781 |
| 6,035,542 | A * | 3/2000 | Woznow et al. .............. | 33/533 |
| D437,796 | S * | 2/2001 | Risi ............................. | D10/70 |
| 6,249,987 | B1* | 6/2001 | Gorfu .......................... | 33/781 |
| D486,406 | S * | 2/2004 | Critelli et al. ............... | D10/70 |
| 6,775,914 | B1* | 8/2004 | Toom ........................... | 33/533 |
| 6,892,470 | B1* | 5/2005 | Olson et al. .................. | 33/782 |

OTHER PUBLICATIONS

Printed Publication from cooperhandtools.com, pp. 1-3, copyright Oct. 19, 2004.*
Printed Publication from DIYTOOLS.co.uk, Trumeter 5000611, pp. 1-2.*
Printed Publication from DIYTOOLS.co.uk, Fisco WH10, pp. 1-2.*

* cited by examiner

*Primary Examiner*—Yaritza Guadalupe
(74) *Attorney, Agent, or Firm*—Charles E. Baxley

(57) ABSTRACT

A distance measuring device includes a housing having a distance meter, a measuring wheel having a wheel axle rotatably engaged into the housing and coupled to the distance meter. A brake wheel is disposed on the wheel axle. A brake arm is pivotally secured in the housing and movable to engage with the brake wheel for braking the brake wheel. A pole includes a foldable structure, a handle is disposed on top of the pole, a brake lever and a handgrip are pivotally secured to the handle and extended out of the handle for being actuated by users, and coupled to the brake arm and the distance meter with flexible brake cable and a flexible wire, which allow the segments of the pole to be folded relative to each other.

6 Claims, 5 Drawing Sheets

DISTANCE MEASURING DEVICE

BACKGROUND OF THE INVENTION

1. Field of the Invention

The present invention relates to a distance measuring device, and more particularly to a distance measuring device having a folding structure foldable to a compact configuration for storing and transportation purposes.

2. Description of the Prior Art

Typical distance measuring devices comprise a flexible reel tape pullable or movable out of a housing, for distance measuring purposes. The flexible tape is required to be wound and received into the housing after the distance measuring operations.

The other typical distance measuring devices comprise a counter or distance meter attached to a wheel axle of a measuring wheel, and rotated or driven by the wheel axle of the wheel, to measure distances.

However, such typical distance measuring devices have no brake equipments for braking or for positioning the measuring wheels, and for preventing the wheels from moving. In addition, the typical distance measuring devices normally comprise a longitudinal pole coupled to the wheel, and the longitudinal pole may not be folded to compact structure, such that the typical distance measuring devices may not be suitably folded and stored, and may thus include a great volume that is adverse for transportation purposes.

The present invention has arisen to mitigate and/or obviate the afore-described disadvantages of the conventional distance measuring devices.

SUMMARY OF THE INVENTION

The primary objective of the present invention is to provide a distance measuring device including a folding structure foldable to a compact configuration for storing and transportation purposes.

The other objective of the present invention is to provide a distance measuring device including a braking device for braking or for positioning the measuring wheels, and for preventing the wheels from moving relative to ground or objects to be measured.

The further objective of the present invention is to provide a distance measuring device including a zero resetting device arranged for allowing the users to easily reset the distance measuring device.

In accordance with one aspect of the invention, there is provided a distance measuring device comprising a housing including a chamber formed therein, a distance meter disposed in the chamber of the housing, a measuring wheel including a wheel axle rotatably engaged into the chamber of the housing, and having a brake wheel disposed thereon, the wheel axle of the measuring wheel being coupled to the distance meter, for distance measuring purposes, a brake arm including a first end pivotally secured to the housing with a pivot axle, and including a second end, the brake arm being disposed around the brake wheel and movable to engage with the brake wheel for braking the brake wheel, a longitudinal pole including a lower segment and an upper segment foldably secured together, to allow the lower and the upper segments to be folded relative to each other, a handle disposed on top of the longitudinal pole, a brake lever and a handgrip pivotally secured to the handle, and extended out of the handle for being actuated by users, a flexible brake cable coupled between the brake lever and the second end of the brake arm, for allowing the brake arm to be actuated toward and against the brake wheel by the brake lever via the brake cable, and a flexible wire coupled between the handgrip and the distance meter, for resetting the distance meter. The flexible brake cable and the flexible wire are received in the longitudinal pole, to allow the lower and the upper segments of the longitudinal pole to be folded relative to each other.

The distance meter includes a reset pin, and the housing includes an actuating bar disposed therein and coupled to the reset pin of the distance meter, for actuating and operating the distance meter. The wire includes a coupler attached thereto and coupled to the actuating bar, to allow the reset pin of the distance meter to be actuated by the handgrip via the wire and the coupler.

The housing includes a spring member disposed therein and coupled to the second end of the brake arm, for biasing the brake arm away from the brake wheel. The handle includes a spring member disposed therein and engaged with the brake lever, to bias the brake lever toward the longitudinal pole.

The distance meter includes a pinion disposed thereon, the measuring wheel includes a first gear disposed on the wheel axle thereof, and a second gear rotatably engaged into the chamber of the housing and engaged with the first gear and the pinion of the distance meter, to allow the pinion of the distance meter to be rotated and driven by the measuring wheel via the first gear of the wheel axle and the second gear.

The lower and the upper segments of the longitudinal pole are pivotally secured together with a pivot shaft, to allow to be folded relative to each other, and a fastener for securing and maintaining the lower and the upper segments of the longitudinal pole at an unfolded working position.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
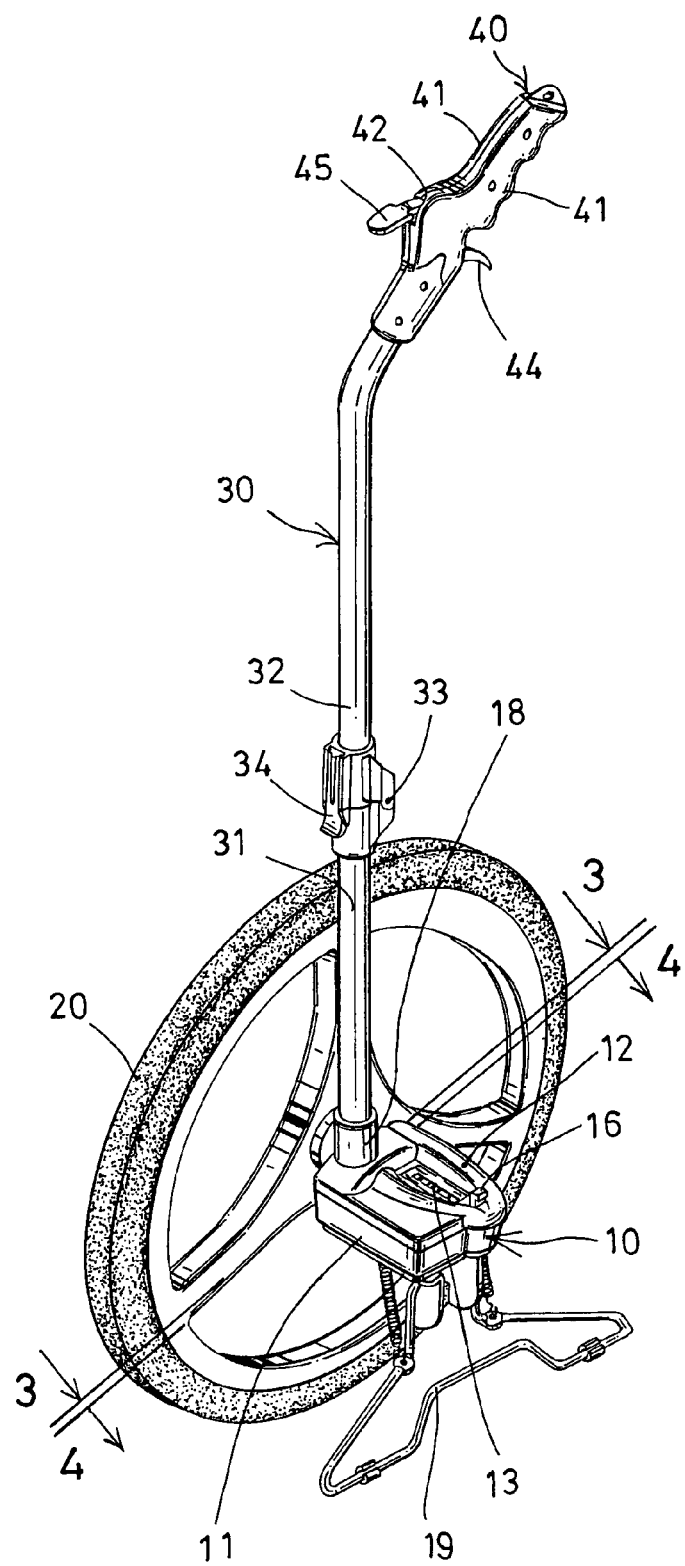
FIG. 1 is a perspective view of a distance measuring device in accordance with the present invention.

Referring to the drawings, and initially to FIGS. 1–4, a distance measuring device in accordance with the present invention comprises a housing 10 including such as a lower housing member 11 and an upper housing member secured together with such as fasteners, latches (not shown), or the like, and including a chamber 14 formed therein, and including a typical counter or distance meter 13 attached or disposed in the chamber 14 of the housing 10 and having a pinion 15 provided thereon.

The distance meter 13 includes a reset button 16 extended out of the housing 10 (FIGS. 1, 2), for being depressed or actuated by users to reset the distance meter 13. The distance meter 13 further includes a reset pin 17 extended therefrom (FIGS. 4, 8), for resetting the distance meter 13, which will be discussed hereafter. The housing 10 includes a hub 18 extended upwardly therefrom, for coupling to a longitudinal pole 30. A kickstand 19 may be attached to the housing 10.

A wheel 20, such as a measuring wheel 20 includes a wheel axle 21 rotatably engaged into the chamber 14 of the housing 10, and includes a gear 22 and a brake wheel 23 disposed or secured on the wheel axle 21. Another gear 24 is further provided and also rotatably engaged into the chamber 14 of the housing 10, and engaged with the gear 22, and also engaged with the pinion 15 of the distance meter 13, to allow the pinion 15 of the distance meter 13 to be rotated or driven by the measuring wheel 20 via the gear 22 of the wheel axle 21 and the gear 24.

A brake arm 25 is further provided and engaged into or received in the chamber 14 of the housing 10, and includes one end rotatably or pivotally secured to the housing 10 with a pivot axle 26. The brake arm 25 is disposed around the brake wheel 23, and is movable to engage onto or to be moved away from the brake wheel 23 by moving the other end 27 of the brake arm 25 relative to the housing 10 and the brake wheel 23.

Figure 2:
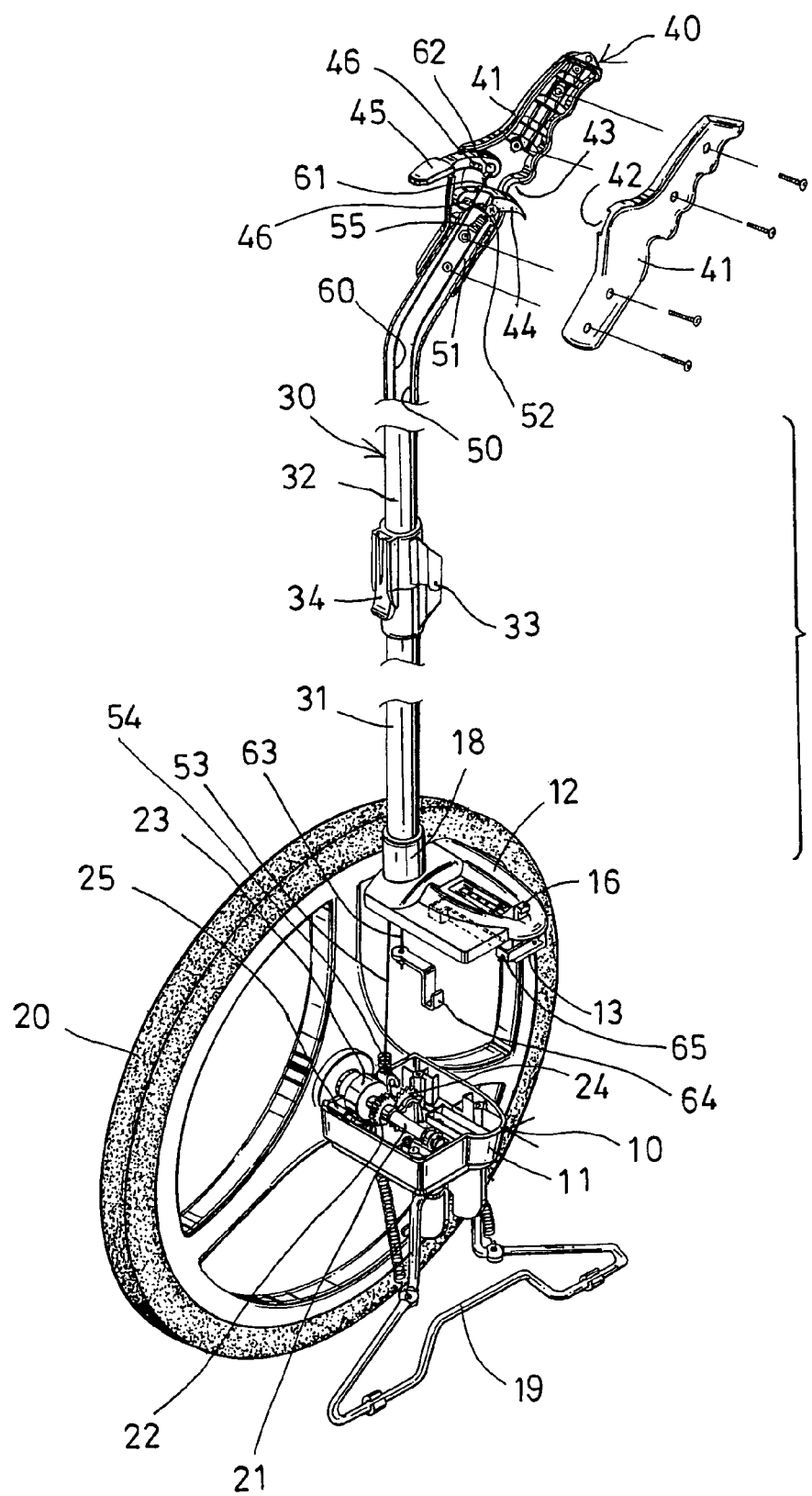
FIG. 2 is a partial exploded view of the distance measuring device.
Figure 5:
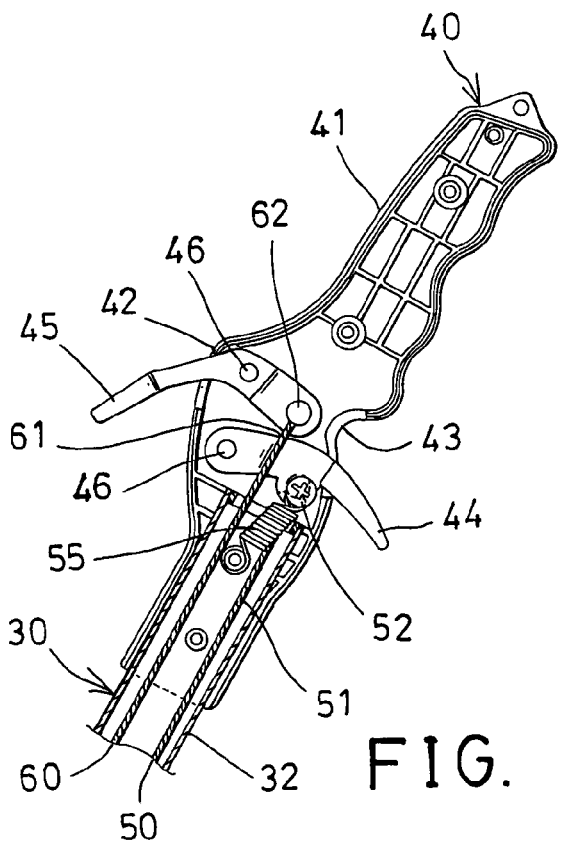
FIG. 5 is a partial plan view illustrating a handle of the distance measuring device, in which one half of the handle has been removed for showing an inner structure of the handle of the distance measuring device.
Figure 9:
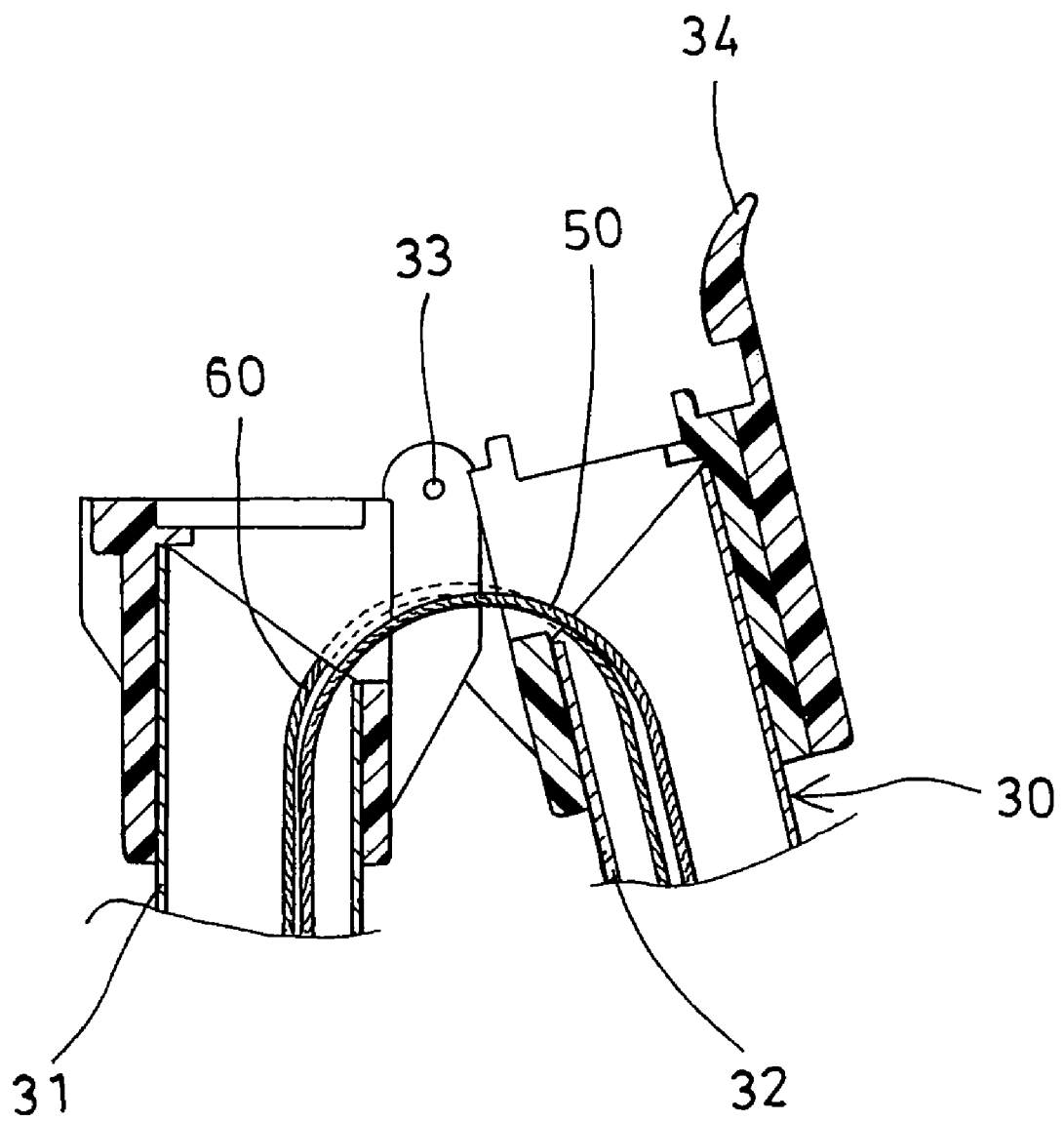
FIG. 9 is another partial cross sectional view illustrating the folding operation of the distance measuring device.

The longitudinal pole 30 may include a telescopic structure, or may include a lower segment 31 and an upper segment 32 rotatably or pivotally secured together with a pivot shaft 33 (FIG. 9), to allow the lower and the upper segments 31, 32 of the longitudinal pole 30 to be rotated or folded relative to each other to a compact folding or storing configuration (FIG. 9). The lower and the upper segments 31, 32 of the longitudinal pole 30 may be locked or secured together with a fastener 34, such as a quick release fastener 34, for securing and maintaining the lower and the upper segments 31, 32 of the longitudinal pole 30 at an unfolding or working position, as shown in FIGS. 1 and 2.

A handle 40 is provided and secured on top of the longitudinal pole 30, and may also include two portions or members 41 secured together with fasteners, latches (not shown), or the like, and may include two openings 42, 43 formed therein, such as formed in the upper and the lower portion thereof respectively. A brake lever 44 and a handgrip 45 are rotatably or pivotally secured to the handle 40 with such as pivot pins 46, and extended out through the openings 43, 42 of the handle 40 respectively (FIGS. 1, 2, 5, 6).

Figure 3:
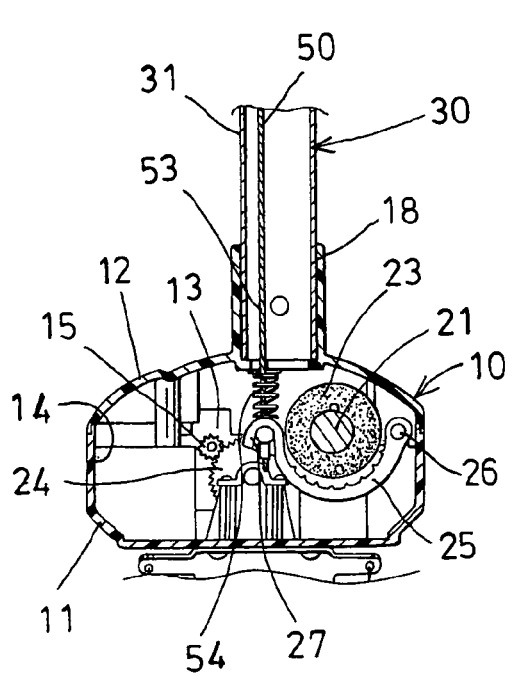
FIG. 3 is a partial cross sectional view taken along lines 3—3 of FIG. 1.
Figure 7:
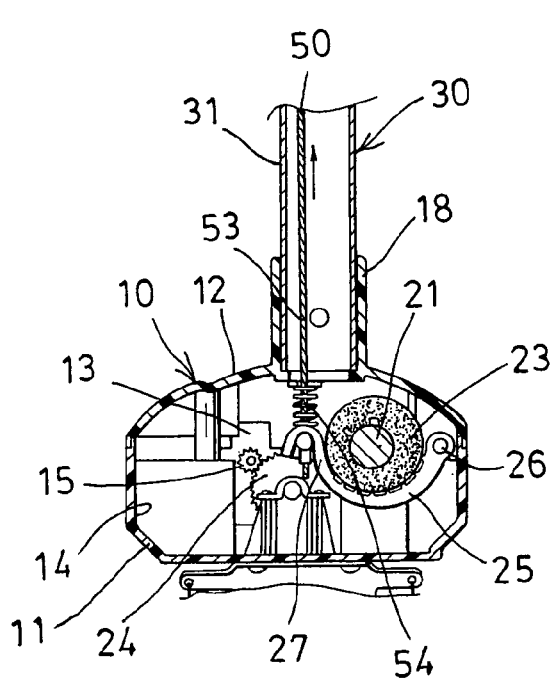
FIGS. 7, 8 are partial cross sectional views similar to FIGS. 3 and 4 respectively, illustrating the operation of the distance measuring device.

A brake cable 50 includes one end 51 secured or coupled to the brake lever 44 with such as a fastener 52, and the other end 53 coupled to the other end 27 of the brake arm 25 (FIGS. 3, 7), for allowing the brake arm 25 to be actuated and forced toward or against the brake wheel 23 by the brake lever 44 via the brake cable 50. A spring member 54 may be engaged with the other end 27 of the brake arm 25, to bias the brake arm 25 away from the brake wheel 23. A further spring member 55 (FIGS. 2, 5, 6) may be engaged with the brake lever 44, to bias or to recover the brake lever 44, or to bias the brake lever 44 toward the pole 30 or the housing 10, or to bias the brake arm 25 away from the brake wheel 23 (FIG. 3).

Figure 4:
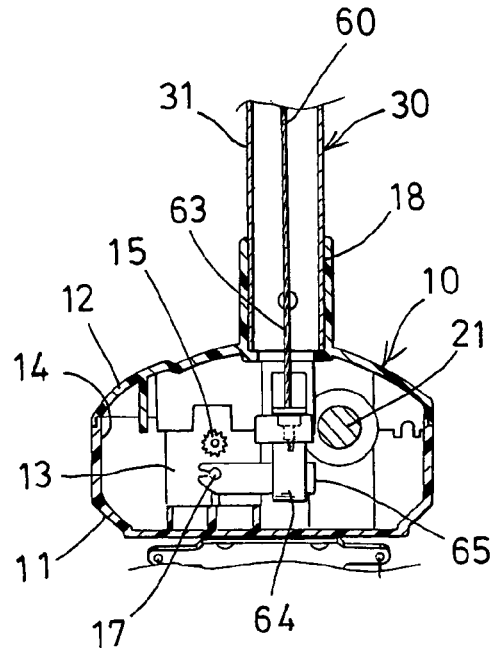
FIG. 4 is a partial cross sectional view taken along lines 4—4 of FIG. 1.
Figure 6:
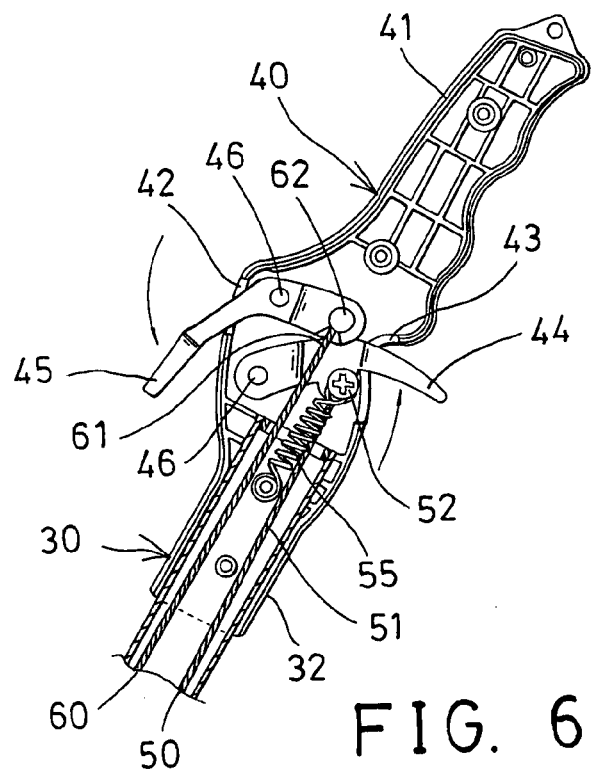
FIG. 6 is a partial plan view similar to FIG. 5, illustrating the operation of the distance measuring device.
Figure 8:
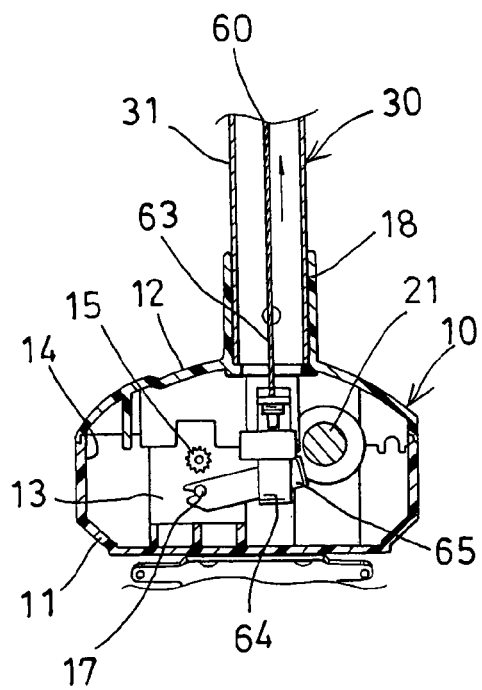

A wire 60 includes one end 61 secured or coupled to the handgrip 45 with such as a fastener or a latch 62, and the other end 63 extended into the chamber 14 of the housing 10. A hook or a coupler 64 is coupled or attached to the other end 63 of the wire 60. An actuating bar 65 is coupled to the reset pin 17 of the distance meter 13, and is coupled to or engaged with the coupler 64, to allow the reset pin 17 of the distance meter 13 to be actuated by the handgrip 45 via the wire 60 and the coupler 64 and the actuating bar 65 (FIGS. 4, 8).

In operation, when the wheel 20 is rotated or moved along ground or objects to be measured, the pinion 15 of the distance meter 13 may be rotated or driven by the measuring wheel 20 via the gear 22 of the wheel axle 21 and the gear 24, to measure the distance. When reaching the required position to be measured, the brake lever 44 may be actuated by the users, to force the brake cable 50 to actuate the brake arm 25, and thus to force the brake arm 25 to engage with the brake wheel 23 for braking the wheel 20 and for position the wheel 20 at the required position. Either of the spring members 54, 55 may bias or recover the brake lever 44 and the brake arm 25 back to the original position.

After the distance measuring operations, the handgrip 45 may be actuated by the users, to actuate the reset pin 17 of the distance meter 13 via the wire 60 and the coupler 64 and the actuating bar 65, in order to reset the distance meter 13 back to zero, and ready for next use. As shown in FIG. 9, the lower and the upper segments 31, 32 of the longitudinal pole 30 may be rotated or folded relative to each other to the compact folding or storing configuration, and may be locked or secured together with the fastener 34, for selectively securing and maintaining the lower and the upper segments 31, 32 of the longitudinal pole 30 at the unfolding or working position as shown in FIGS. 1 and 2.

It is to be noted that the arrangement of the distance measuring device allows the distance meter 13 and the brake arm 25 to be actuated or operated with the flexible brake cable 50 and the flexible wire 60, and thus to allow the lower and the upper segments 31, 32 of the longitudinal pole 30 to be rotated or folded relative to each other to the compact folding or storing configuration.

Accordingly, the distance measuring device in accordance with the present invention includes a folding structure foldable to a compact configuration for storing and transportation purposes, and includes a braking device for braking or for positioning the measuring wheels, and for preventing the wheels from moving relative to ground or objects to be measured, and includes a zero resetting device arranged for allowing the users to easily reset the distance measuring device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A distance measuring device comprising:
   a housing including a chamber formed therein,
   a distance meter disposed in said chamber of said housing, and including a pinion disposed thereon,
   a measuring wheel including a wheel axle rotatably engaged into said chamber of said housing, and having a brake wheel disposed thereon, said wheel axle of said measuring wheel being coupled to said distance meter, for distance measuring purposes, said measuring wheel including a first gear disposed on said wheel axle thereof, and a second gear rotatably engaged into said chamber of said housing and engaged with said first gear and said pinion of said distance meter, to allow said pinion of said distance meter to be rotated and driven by said measuring wheel via said first gear of said wheel axle and said second gear, a brake arm including a first end pivotally secured to said housing with a pivot axle, and including a second end, said brake arm being disposed around said brake wheel and movable to engage with said brake wheel for braking said brake wheel, a longitudinal pole including a lower segment and an upper segment foldably secured together, to allow said lower and said upper segments to be folded relative to each other, a handle disposed on top of said longitudinal pole, a brake lever and a handgrip pivotally secured to said handle, and extended out of said handle for being actuated by users, a flexible brake cable coupled between said brake lever and said second end of said brake arm, for allowing said brake arm to be actuated toward and against said brake wheel by said brake lever via said brake cable, and a flexible wire coupled between said handgrip and said distance meter, for resetting said distance meter, and said flexible brake cable and said flexible wire being received in said longitudinal pole, to allow said lower and said upper segments of said longitudinal pole to be folded relative to each other.

2. The distance measuring device as claimed in claim 1, wherein said distance meter includes a reset pin, and said housing includes an actuating bar disposed therein and coupled to said reset pin of said distance meter, for actuating and operating said distance meter.

3. The distance measuring device as claimed in claim 2, wherein said wire includes a coupler attached thereto and coupled to said actuating bar, to allow said reset pin of said distance meter to be actuated by said handgrip via said wire and said coupler.

4. The distance measuring device as claimed in claim 1, wherein said housing includes a spring member disposed therein and coupled to said second end of said brake arm, for biasing said brake arm away from said brake wheel.

5. The distance measuring device as claimed in claim 1, wherein said handle includes a spring member disposed therein and engaged with said brake lever, to bias said brake lever toward said longitudinal pole.

6. The distance measuring device as claimed in claim 1, wherein said lower and said upper segments of said longitudinal pole are pivotally secured together with a pivot shaft, to allow to be folded relative to each other, and a fastener for securing and maintaining said lower and said upper segments of said longitudinal pole at an unfolded working position.

* * * * *